(12) United States Patent
Alasry

(10) Patent No.: US 9,616,809 B1
(45) Date of Patent: Apr. 11, 2017

(54) LANE CHANGE PREDICTION AND TURN SIGNAL ACTIVATION UPON OBSERVATION OF HEAD AND EYE MOVEMENT

(71) Applicants: DENSO International America, Inc., Southfield, MI (US); DENSO CORPORATION, Kariya, Aichi-pref. (JP)

(72) Inventor: Bilal Alasry, Dearborn, MI (US)

(73) Assignees: Denso International America, Inc., Southfield, MI (US); DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/224,949

(22) Filed: Aug. 1, 2016

(51) Int. Cl.
| B60Q 1/00 | (2006.01) |
| B60Q 1/34 | (2006.01) |
| B60Q 5/00 | (2006.01) |
| B60Q 9/00 | (2006.01) |
| G08G 1/16 | (2006.01) |
| B60W 40/08 | (2012.01) |
| G06K 9/00 | (2006.01) |

(52) U.S. Cl.
CPC ............ *B60Q 1/346* (2013.01); *B60Q 5/006* (2013.01); *B60Q 9/008* (2013.01); *B60W 40/08* (2013.01); *G06K 9/00228* (2013.01); *G08G 1/167* (2013.01)

(58) Field of Classification Search
None
See application file for complete search history.

(56) References Cited

U.S. PATENT DOCUMENTS

| 6,876,300 B2 | 4/2005 | Ponziani | |
| 8,660,734 B2 | 2/2014 | Zhu et al. | |
| 8,682,533 B2 | 3/2014 | Kojima et al. | |
| 2009/0174540 A1* | 7/2009 | Smith ................ | B60Q 1/34 340/465 |
| 2011/0199200 A1* | 8/2011 | Lueke ................ | B60Q 1/38 340/435 |
| 2016/0257252 A1* | 9/2016 | Zaitsev .............. | G06K 9/00791 |

FOREIGN PATENT DOCUMENTS

JP        2009166734 A    7/2009

* cited by examiner

*Primary Examiner* — Brent Swarthout
(74) *Attorney, Agent, or Firm* — Harness, Dickey & Pierce, P.L.C.

(57) ABSTRACT

A system and method are provided that include a driver status monitor having at least one of an infrared sensor and a camera configured to sense facial feature data associated with an operator of a subject vehicle and an electronic control module that receives the facial feature data and determines that the operator has looked at one of a side mirror and a rear-view mirror and that the operator has looked at a blind spot of the subject vehicle within a predetermined time period. A controller in communication with the driver status monitor activates a turn signal system having at least one turn signal in response to the driver status monitor determining that the operator has looked at one of the side mirror, rear-view mirror, and the blind spot of the subject vehicle.

13 Claims, 4 Drawing Sheets

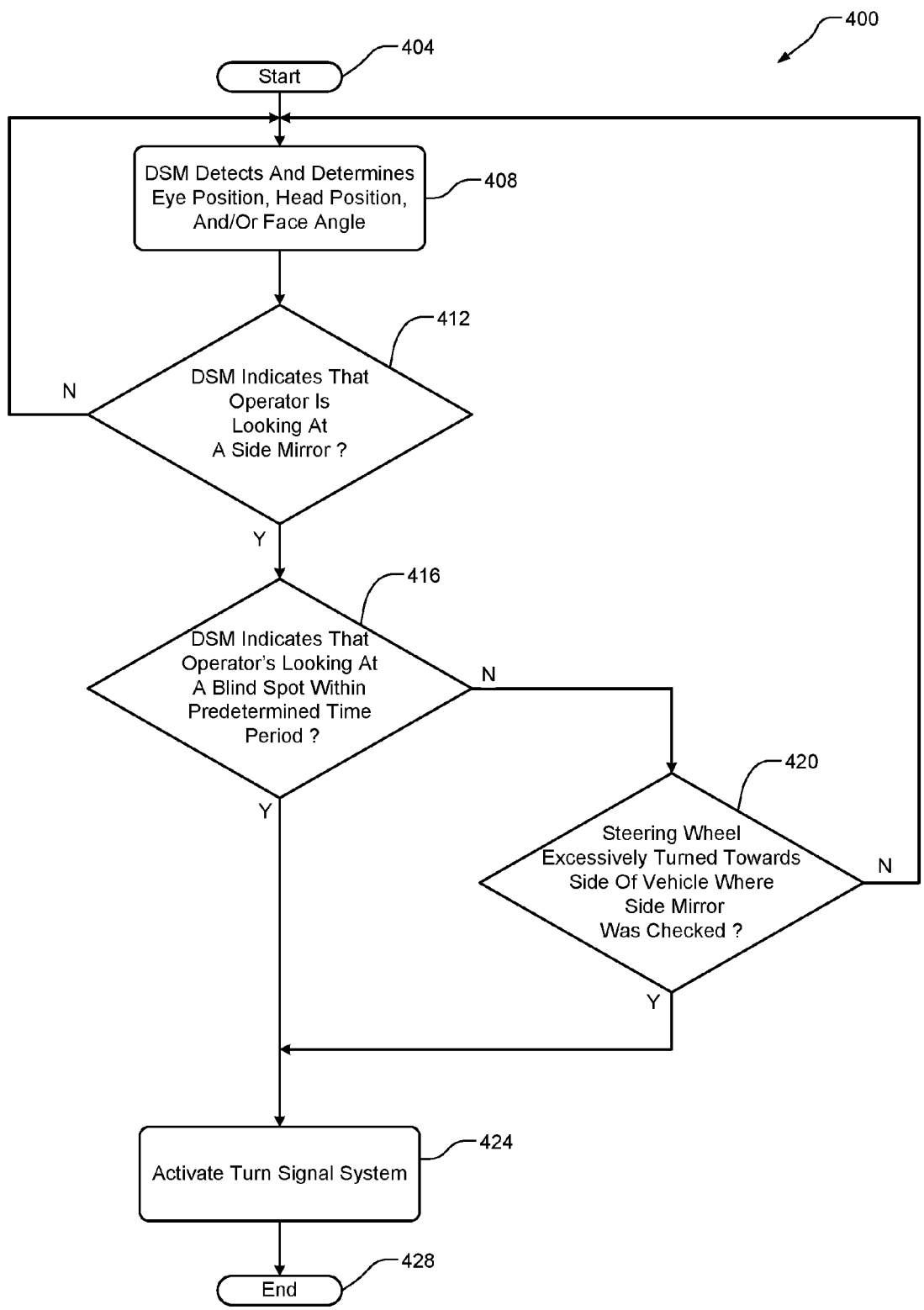

LANE CHANGE PREDICTION AND TURN SIGNAL ACTIVATION UPON OBSERVATION OF HEAD AND EYE MOVEMENT

FIELD

The present disclosure relates to automated lane change prediction and turn signal activation and, in particular, to lane change prediction and turn signal activation based on observation of a driver's head and eye movement.

BACKGROUND

This section provides background information related to the present disclosure which is not necessarily prior art.

In an effort to avoid automobile collisions, an operator of a vehicle may use a turn signal of the vehicle to indicate to other vehicle operators that he or she intends to change lanes. Additionally, the operator may also check his or her rear-view mirrors, side mirrors, and blind spot(s) to ensure that it is safe to make a lane change. In some instances, however, a driver may attempt to make a lane change without using a turn signal of the vehicle. As such, there is a need for an automated turn lane signal activation system that responds to an operator's intent to change lanes.

SUMMARY

This section provides a general summary of the disclosure, and is not a comprehensive disclosure of its full scope or all of its features.

The present teachings include systems and methods for lane change prediction and turn signal activation upon observation of head and eye movement. A driver status monitor includes at least one of an infrared sensor and a camera configured to sense facial feature data associated with an operator of a subject vehicle. The driver status monitor includes an electronic control module that receives the facial feature data and determines that the operator has looked at one of a side mirror and a rear-view mirror and that the operator has looked at a blind spot of the subject vehicle within a predetermined time period. The system also includes a turn signal system having at least one turn signal and a controller in communication with the driver status monitor that activates the turn signal system in response to the driver status monitor determining that the operator has looked at one of the side mirror and the rear-view mirror, and that the operator has looked at the blind spot of the subject vehicle within the predetermined time period.

The present teachings also include a method that includes sensing, using a driver status module, facial feature data associated with an operator of a subject vehicle. The method also includes receiving, using an electronic control module of the driver status module, the facial feature data associated with the operator of the subject vehicle. The method also includes determining, using the electronic control module of the driver status module, whether the operator has looked at one of a side mirror and a rear-view mirror within a predetermined time period. The method also includes determining, using the electronic control module of the driver status module, whether the operator has looked at a blind spot of the subject vehicle within the predetermined time period. The method also includes communicating, using the electronic control module of the driver status module, a signal to a controller in response to the electronic control module determining the operator has looked at one of the side mirror and the rear-view mirror and the operator has looked at the blind spot of the subject vehicle within the predetermined time period. The method also includes activating a turn signal system in response to the controller receiving the signal from the electronic control module of the driver status module.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 4 is a flowchart describing the operation of the automated turn signal system.

Corresponding reference numerals indicate corresponding parts throughout the several views of the drawings.

DETAILED DESCRIPTION

Example embodiments will now be described more fully with reference to the accompanying drawings.

Figure 1:
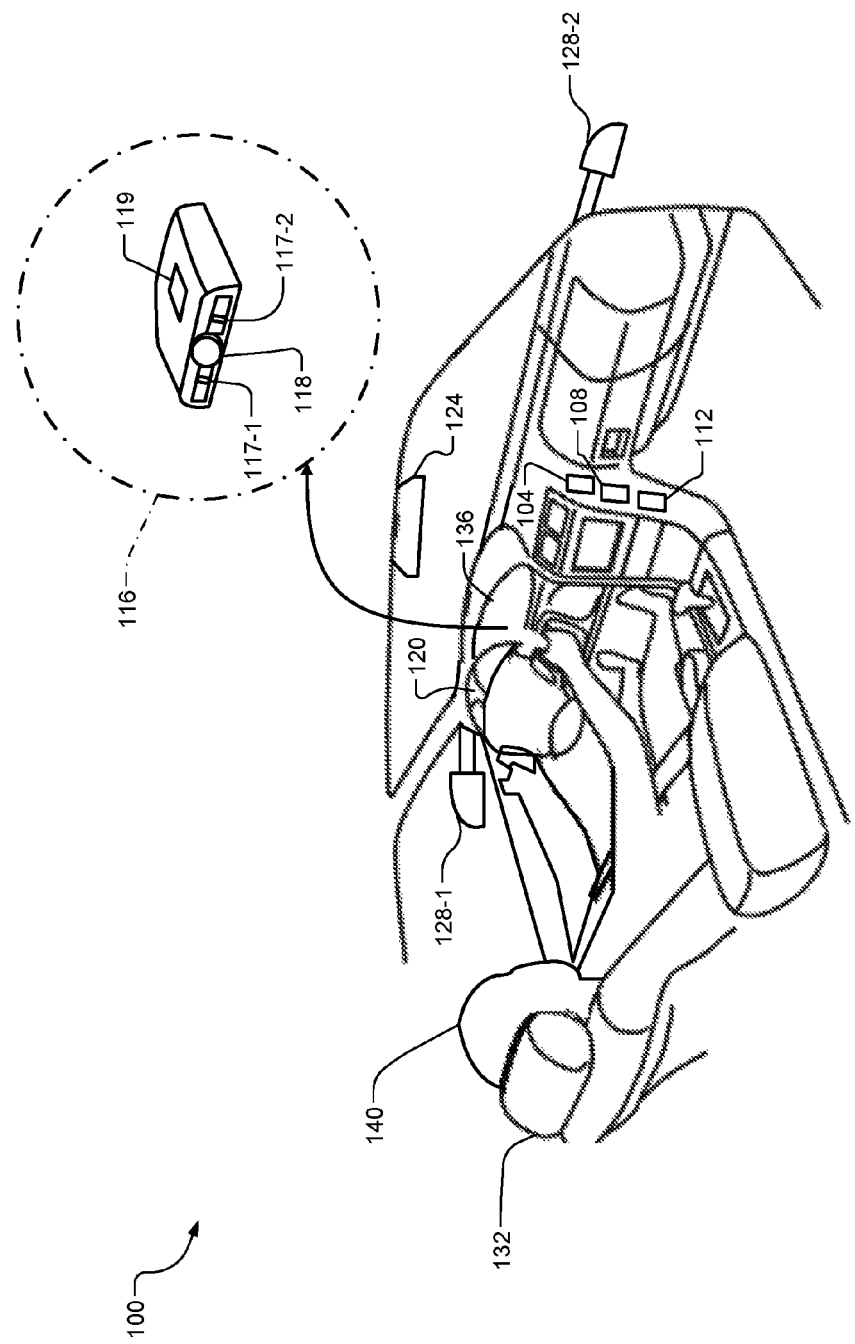
FIG. 1 is a high-level diagram of an example embodiment of the automated turn signal system.

With reference to FIG. 1, a high-level diagram of an example embodiment of the automated turn signal system is shown. The automated turn signal system may be located within a vehicle 100, which may include a controller 104, a turn signal system 108, a blind spot warning system 112, a driver status monitor (DSM) 116, a steering wheel 120, a rear-view mirror 124, side mirrors 128-1, 128-2, a driver seat 132, and a dashboard 136. As shown in FIG. 1, the vehicle 100 may be operated by an operator 140.

The dashboard 136 may include a control panel that displays a variety of measurements and controls of the vehicle 100. As an example, the dashboard 136 may include a speedometer, tachometer, odometer, fuel gauge, gearshift position, seat belt warning lights, parking-brake engagement warning lights, engine malfunction light, turn-signal indicators, high beam indicators, tail light indicators, fog light indicators, low tire pressure indicators, and/or traction control indicators. Furthermore, the dashboard 136 may also include indicators for low fuel, low oil pressure, low tire pressure, faults in an airbag system, cruise control, and for open doors and trunks.

The dashboard 136 may also include the DSM 116, which may be mounted over a steering column connected to the steering wheel 120 of the vehicle 100. The DSM 116 may include a plurality of infrared light-emitting diodes (LEDs) and infrared sensors 117-1, 117-2, a camera 118, and an electronic control module (ECM) 119. The DSM 116 may be configured to detect a face angle, a head position, and an eye position of the operator 140 of the vehicle 100. For example, the ECM 119 may receive facial feature data sensed by the LEDs and infrared sensors 117-1, 117-2 and the camera 118, including images of the face and head of the operator 140 of the vehicle 100, and the ECM 119 may analyze the facial feature data to determine the face angle, head position, and/or eye position of the operator 140. Additionally or alternatively, the ECM 119 may be configured to detect long-duration eye closure and to estimate a drowsiness level of the operator 140 based on the face angle, head position, and/or eye position of the operator 140.

Based on these parameters, the DSM 116 may be configured to determine when the operator 140 intends to change lanes, as discussed in further detail below. When the operator's intent to change lanes is recognized by the DSM 116, the DSM 116 may be configured to communicate a signal to the controller 104 indicating the intent to change lanes and which lane the operator 140 intends to change the vehicle to. In response to receiving the signal indicating the intent to change lanes, the controller 104 may automatically activate the turn signal system 108 to turn on the appropriate turn signal (left or right), thereby eliminating the need for the operator 140 to manually activate the turn signal system 108. Additionally, the turn signal indicator light of the dashboard 136 may turn on, thus indicating to the operator 140 that the turn signal system 108 is activated.

The infrared LEDs and infrared sensors 117-1, 117-2, the camera 118, and the ECM 119 of the DSM 116 may be configured to form a sensing system in which the face angle, head position, and/or eye position are detected. Additionally or alternatively, the infrared LEDs and infrared sensors 117-1,117-2 and the camera 118 of the DSM 116 may also be configured to detect an operator's ear position, eyebrow position, nose position, and/or mouth position. The ECM 119 is in communication with the infrared LEDs and infrared sensors 117-1,117-2 and the camera 118, and includes instructions stored on a computer-readable, non-transitory memory component, such as a read-only memory or a random access memory, that are executable by a processor. The instructions stored on the non-transitory memory component may include algorithms for processing the data and images detected by the infrared LEDs and infrared sensors 117-1, 117-2 and the camera 118, and determining a plurality of characteristics or parameters (e.g., three-dimensional coordinates (x,y,z)) related to the operator's various facial features, including face angle, head position, and/or eye position, as noted above. The algorithms may include a variety of image processing and/or computer vision techniques for facial recognition and monitoring driver status of the operator 140 of the vehicle 100, as understood by one of ordinary skill in the art. For example, algorithms for performing image processing and/or computer vision techniques using an Advanced Driver Assistance System for Vehicle, including a driver status monitor, is described in detail in U.S. Pat. No. 9,308,914, assigned to DENSO International America, Inc., which is incorporated herein by reference in its entirety.

As such, the DSM 116 may be configured to recognize certain parameters, such as face angle, eye position, and/or head position, which may indicate the operator's intent to change lanes. As an example, the DSM 116 may be configured to recognize the operator's intent to change lanes in response to the eye position of the operator 140 (represented by, for example, one or more 3-D coordinates) indicating the operator 140 is looking at the rear-view mirror 124 or one of the side mirrors 128-1, 128-2, and/or the operator is looking at a blind spot of the vehicle 100. Additionally or alternatively, the DSM 116 may be configured to recognize the operator's intent to change lanes when the head position of the operator 140 (represented by, for example, one or more 3-D coordinates) indicates the operator 140 is looking at the rear-view mirror 124 or one of the side mirrors 128, and/or the operator is looking at a blind spot of the vehicle 100. In response to the determination of the operator's intent to change lanes, the DSM 116 may communicate to the controller 104 that the operator intends to change lanes and indicate the intended destination lane (right or left). The controller 104 then activates the turn signal system 108 to turn on the appropriate turn signal (left or right) of the vehicle 100.

Additionally or alternatively, the DSM 116 may be configured to determine the operator's intent to change lanes in response to an eye or head trajectory detected by the DSM 116 as a result of an eye or head movement. As an example, the DSM 116 may be configured to recognize the operator's intent to change lanes when an original eye position of the operator 140 (represented by, for example, one or more 3-D coordinates) changes to a new eye position in accordance with a predefined trajectory that is defined in the facial recognition algorithm as an intent to change lanes. Furthermore, the DSM 116 may be configured to recognize the operator's intent to change lanes only if the change from the original eye position to the new eye position of the operator 140 occurs within a certain period of time. This may allow the DSM 116 to differentiate between unintentional eye movements and quick, deliberate eye movements toward one of the mirrors or blind spots, which may indicate an intent to change lanes. Accordingly, the DSM 116 may communicate to the controller 104 that the operator intends to change lanes and indicate the intended destination lane (right or left) in response to the eyes of the operator 140 moving toward one of the mirrors or blind spots at a certain speed. The controller 104 then activates the turn signal system 108 to turn on the appropriate turn signal (left or right) of the vehicle 100.

Likewise, the DSM 116 may recognize the intent to change lanes based on head movement. As an example, the DSM 116 may be configured to recognize the operator's intent to change lanes when an original head position of the operator 140 (represented by, for example, one or more 3-D coordinates) changes to a new head position in accordance with a predefined trajectory that is defined in the facial recognition algorithm as an intent to change lanes. Furthermore, the DSM 116 may be configured to recognize the operator's intent to change lanes only if the change from the original head position to the new head position of the operator 140 occurs within a certain period of time. This may allow the DSM 116 to differentiate between head movements that indicate intent to communicate with one in a passenger seat of the vehicle 100, for example, and deliberate head movements toward one of the mirrors or blind spots, which may indicate an intent to change lanes. Accordingly, the DSM 116 may communicate to the controller 104 that the operator intends to change lanes and indicate the intended destination lane (right or left) in response to the head of the operator 140 moving toward one of the mirrors or blind spots at a certain speed. The controller 104 then activates the turn signal system 108 to turn on the appropriate turn signal (left or right) of the vehicle 100.

Additionally or alternatively, the DSM 116 may be configured to detect the intent to change lanes by a detection of ears or a jawline in addition to eye position, head position, and/or face angle. As an example, the DSM 116 may be configured to communicate a signal to the controller 104 to activate the turn signal system 108 in response to the DSM 116 determining that one of the eye position, head position, and/or face angle indicates that the operator 140 is looking at one of the mirrors or blind spots and in response to detecting the presence of the jawline on a side of the operator's face and/or ear of the operator 140 corresponding to the direction that he or she is turning.

The DSM 116 may be configured to conduct an initial facial feature scan on the operator 140 upon starting or turning on the vehicle. As such, the facial features of the operator 140 may be identified and recorded at an initial position, thereby establishing a reference location for which changes to the face angle, eye position, and/or eye position may be compared to.

Furthermore, the facial feature scan of the operator 140 may allow different operators with different facial feature geometries and positions the ability to use the automated turn signal activation system of the vehicle 100. Multiple operators may be able to store their respective reference locations in the ECM 119 or another controller in communication with the DSM 116, thereby eliminating the need to perform the initial facial feature scan each time the operator 140 turns on the vehicle. As such, each operator 140 may access his or her respective reference locations stored on the ECM 119 by means of a login or identification of the operator 140 upon starting the vehicle 100. As an example, the reference locations corresponding to different operators may be stored by first and last name, and the operator 140 may select his or her name from a list of operators on a touchscreen interface. As such, the DSM 116 may then be configured to perform the facial feature detection algorithms based on these reference points.

The DSM 116 may have instructions stored on the non-transitory memory component of the ECM 119 that include a priority level system of head and eye movements and/or positions that indicate the intent to change lanes. As an example, the first level of priority may be assigned to the operator's head and/or eye movement corresponding to the operator 140 looking at his or her blind spot, which may be the strongest indication that the operator 140 intends to change lanes. As such, the first step of the method of operation may include the DSM 116 being configured to first detect and determine whether the operator 140 is looking at his or her blind spot. This may be accomplished, for example, when the operator 140 has turned his or her head far enough over his or her shoulder at one of the blind spots. Thus, the location/movement data corresponding to turning the operator's head over his or her shoulder may automatically activate the turn signal system 108.

A second level of priority may be assigned to the operator's head and/or eye movement corresponding to the operator 140 looking at his or her rear-view mirror 124. As such, the DSM 116 may be configured to detect and determine whether the operator 140 is looking at the rear-view mirror 124 after it has determined that the operator 140 is not looking over his shoulder at a blind spot. The DSM 116 may be configured to automatically activate the turn signal system 108 in response to this maneuver, or the DSM 116 may require separate, additional conditions to be satisfied in order to activate the turn signal system 108 (i.e., the steering wheel 120 being turned excessively in a direction such that the steering angle is greater than a steering angle threshold, a threshold eye/head movement speed that needs to be satisfied, wherein the threshold eye/head movement speed indicates an intent to change lanes, etc.).

A third level of priority may be assigned to the operator's head and/or eye movement corresponding to the operator 140 looking at one of the side mirrors 128. As such, the DSM 116 may be configured to detect and determine whether the operator 140 is looking at one of the side view mirrors after it has determined that the operator 140 is not looking over his shoulder at a blind spot nor is he or she looking at the rear-view mirror 124. The DSM 116 may be configured to automatically activate the turn signal system 108 in response to this maneuver, or the DSM 116 may require separate, additional conditions to be satisfied in order to activate the turn signal system 108 (i.e., the steering wheel 120 being turned excessively to the side where the side mirror 128 was checked such that the resulting steering angle is greater than a steering angle threshold, a threshold eye/head movement speed that needs to be satisfied, wherein the threshold eye/head movement speed indicates an intent to change lanes, etc.).

Figure 2:
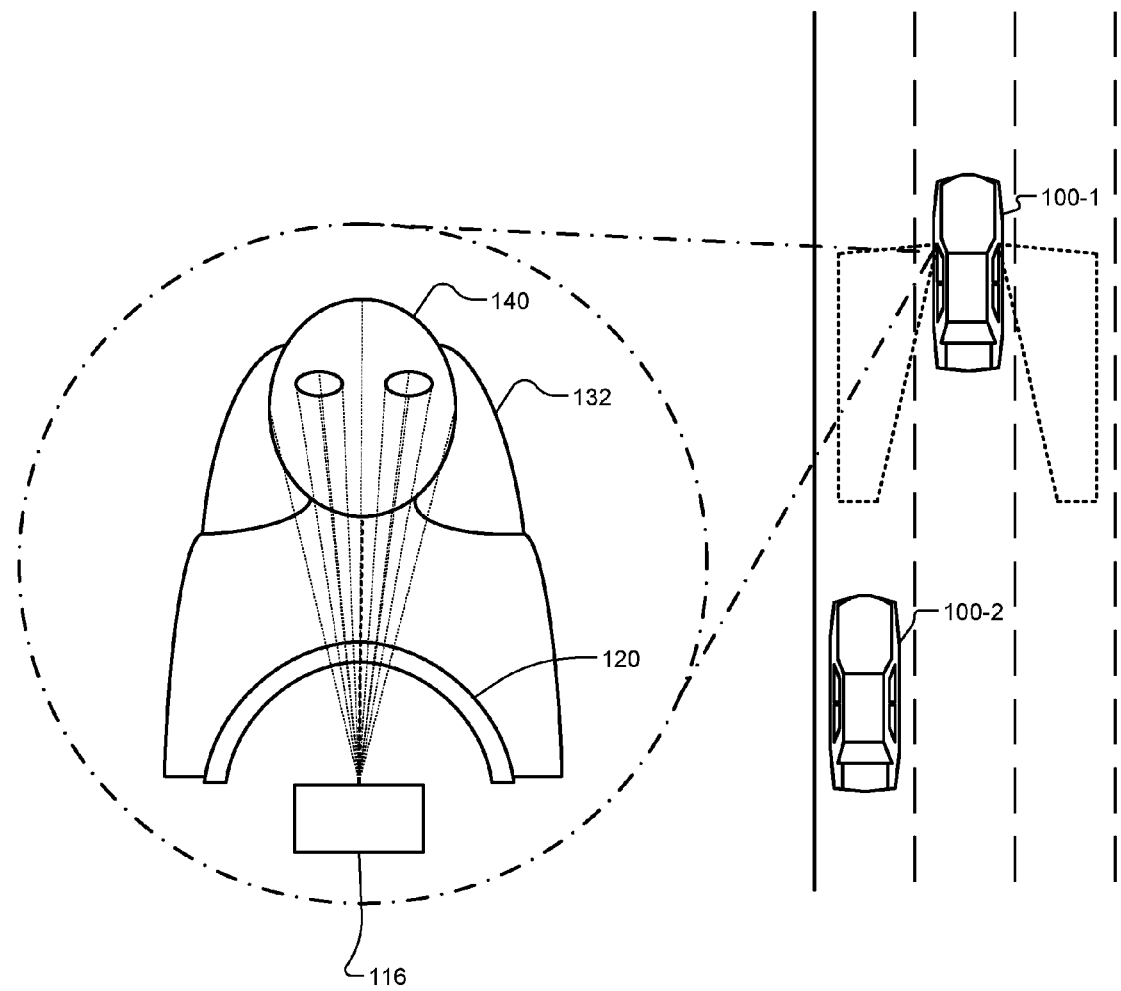
FIG. 2 is a diagram of the automated turn signal system being activated in a subject vehicle that is attempting to make a lane change.

With reference to FIG. 2, a diagram of the automated turn signal system being activated in response to an attempt to change lanes is shown. In this embodiment, the operator 140 is operating a subject vehicle 100-1, and a secondary vehicle 100-2 is shown in a separate lane. As the operator 140 drives the subject vehicle 100-1, the DSM 116 detects and determines the head and/or eye positions of the operator 140, as shown by the dotted lines in the figure between the DSM 116 and the head and face of the operator 140. While FIG. 2 shows four points of each eye and the head being detected and determined by the DSM 116, the DSM 116 may be configured to detect and measure additional points along the perimeter or interior of the head and/or eyes in order to improve the accuracy of the facial recognition algorithm. Additionally or alternatively, the DSM 116 may detect and determine the face angle, nose positions, ear positions, and/or jawline positions to improve the accuracy of the facial recognition algorithm. As described above, if the head and/or eye movements of the operator 140 indicate, according to the DSM 116, that the operator 140 intends to change lanes, as discussed above, then the DSM 116 may activate the turn signal system 108.

Figure 3:
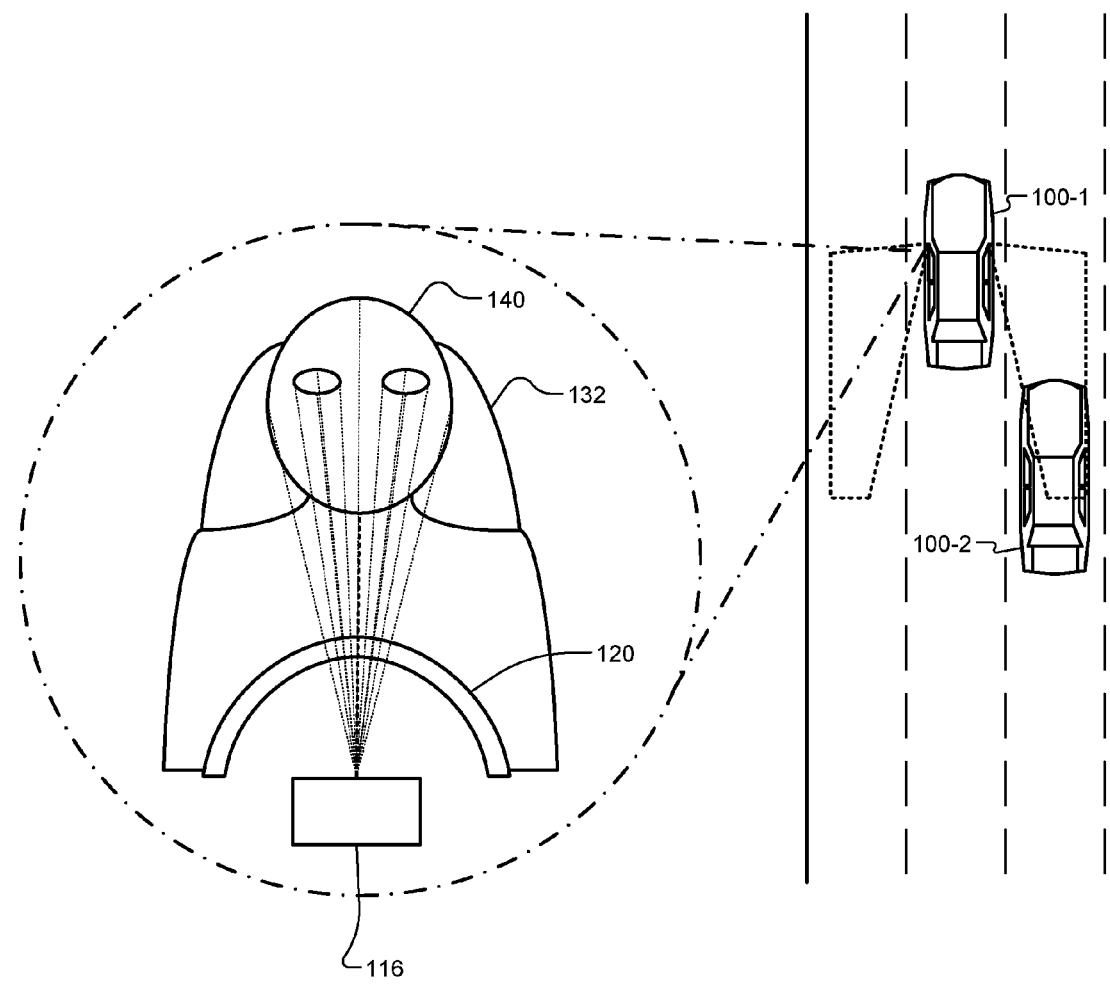
FIG. 3 is a diagram of the automated turn signal system being activated in a subject vehicle that is attempting to make a lane change with a secondary vehicle in a blind spot.

With reference to FIG. 3, a diagram of the automated turn signal system being activated in the subject vehicle 100-1 with the secondary vehicle 100-2 in a blind spot is shown. Contrary to FIG. 2, in this embodiment, the secondary vehicle 100-2 is located within a blind spot of the subject vehicle 100-1. Accordingly, in addition to activating the turn signal system 108 of the subject vehicle 100-1 as described above with reference to FIG. 2, the controller 104, in response to a signal from the DSM 116, may also be configured to activate the blind spot warning system 112 within the subject vehicle 100-1 to indicate the presence of an object in one of the blind spots of the subject vehicle 100-1. For example, a Blind-Spot Warning System for an Automotive Vehicle is described in further detail in U.S. Pat. No. 7,161,472, assigned to DENSO International America, Inc., which is incorporated herein by reference in its entirety. As another example, a Method and Apparatus for Detecting Vehicle Running in Blind Spot, and Method and Apparatus for Giving Warning in Changing Cruising Lane is described in further detail in U.S. Pub. No. 2014/0081566 assigned to DENSO Corporation, which is incorporated herein by reference in its entirety.

As an example, in response to a determination that the secondary vehicle 100-2 is located within a blind spot of the subject vehicle 100-1, the blind spot warning system 112 may provide an alert to the operator 140 indicating the presence of the secondary vehicle 100-2 in the blind spot using a visual alert (i.e., a flashing icon on the dashboard 136), an auditory alert (i.e., a beep or loud audio tone), or a haptic alert (i.e., using tapping vibration pulses on the steering wheel 120 or the driver seat 132 to alert the operator 140 to the secondary vehicle 100-2 in the blind spot of the subject vehicle 100-1).

Additionally or alternatively, the DSM 116 may be configured to take corrective action in response to a turn signal activation and the presence of an object in one of the blind spots, such as communicating to a controller of the subject vehicle 100-1 that corrective steering actions need to be taken (i.e., prevent the lane change from occurring by steering the subject vehicle 100-1 back into the original lane). This may be especially beneficial when the operator 140 checks his or her blind spot and attempts to change lanes, but fails to see a vehicle or other object located in the blind spot. Thus, the implementation of a blind spot warning system 112, in conjunction with the DSM 116, may provide additional safety benefits to the operator 140 of the subject vehicle 100-1.

With reference to FIG. 4, an example flowchart 400 describing the operation of the automated turn signal activation system is shown. The operation may be performed by, for example, the DSM 116, the controller 104, and the turn signal system 108 of the vehicle 100 and starts at 404. At 408, the DSM 116 detects and determines the eye position, head position, and/or face angle of the operator 140 using, for example, the image processing or computer vision techniques, as discussed above. At 412, the DSM 116 determines whether the operator 140 is looking at a side mirror 128. This may be determined by, for example, the DSM's 116 determination that a certain threshold for one of the parameters is satisfied or exceeded and/or that one of the parameters is within a set of predetermined values that indicate the operator 140 is looking at a side mirror 128. If so, the DSM 116 proceeds to 416; otherwise, the DSM 116 loops back to 408 and continues to monitor the eye position, head position, and/or face angle of the operator 140.

At 416, the DSM 116 determines whether the operator is looking at a blind spot within a predetermined time period. As an example, to perform a lane change, the operator may first check one of the mirrors and then check the blind spot of the vehicle before changing lanes. As such, the DSM 116 may be configured to determine whether the operator looks at one of the blind spots within a certain time period, such as two seconds, after looking at one of the mirrors. This may be done to avoid an inadvertent determination of an intent to change lanes when, for example, the operator 140 looks at the rear-view mirror 424; the operator 140 decides not to change lanes; and the operator 140 looks at a blind spot ten minutes later. In order to determine whether the operator is looking at a blind spot, for example, the DSM 116 may determine that a certain threshold for one of the parameters is satisfied or exceeded and/or that one of the parameters is within a set of predetermined values that indicate the operator 140 is looking at a blind spot. If so, the DSM 116 proceeds to 424; otherwise, the operation proceeds to 420.

At 420, the DSM 116 determines whether the steering wheel 120 is excessively turned towards the side of the vehicle 100 where the side mirror 128 was checked such that a steering angle is greater than a steering angle threshold. This step may be included if, for example, the DSM 116 includes a priority level system that requires an additional condition to be satisfied along with the DSM 116 determining that the operator 140 is looking at a blind spot. If so, the operation proceeds to 424; otherwise, if the steering wheel is not being excessively turned, which indicates an intent to maintain the current lane and to, for example, simply look over his or her shoulder to have a conversation with a passenger located in the passenger seat of the vehicle 100, the DSM 116 returns to 408. At 424, the DSM 116 communicates the signal to the controller 104 indicating that the operator intends to change lanes and indicating the determined destination lane for the lane change. In response to the signal, the controller 104 communicates with the turn signal system 108 and directs the turn signal system 108 to activate a turn signal of the vehicle 100 on a side of the vehicle corresponding to the anticipated lane change, and in addition, the turn signal lights of the dashboard 136 may be activated. The operation ends at 428.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

In this application, including the definitions above, the terms "controller," "module," and "system" may refer to, be part of, or include circuits or circuitry that may include processor hardware (shared, dedicated, or group) that executes code and memory hardware (shared, dedicated, or group) that stores code executed by the processor hardware. The code is configured to provide the features of the controller, modules, and systems described herein. In addition, in this application the terms "module" or "controller" may be replaced with the term "circuit."

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A system comprising:
   a driver status monitor having at least one of an infrared sensor and a camera configured to sense facial feature data associated with an operator of a subject vehicle and an electronic control module that receives the facial feature data and determines that the operator has looked at one of a side mirror and a rear-view mirror and that the operator has looked at a blind spot of the subject vehicle within a predetermined time period;
   a turn signal system having at least one turn signal; and
   a controller in communication with the driver status monitor that activates the turn signal system in response to the driver status monitor determining that the operator has looked at one of the side mirror and the rear-view mirror and that the operator has looked at the blind spot of the subject vehicle within the predetermined time period.

2. The system of claim 1 further including a blind spot warning system in communication with the controller, the blind spot warning system configured to detect a presence of a secondary vehicle in the blind spot of the subject vehicle and generate an alert indicating the presence of the secondary vehicle in the blind spot of the subject vehicle.

3. The system of claim 2, wherein the alert includes at least one of a visual alert, an audio alert, and a haptic alert.

4. The system of claim 2, wherein the controller is configured to take corrective action in response to the blind spot warning system detecting the presence of the secondary vehicle in the blind spot of the subject vehicle.

5. The system of claim 1, wherein the facial feature data includes at least one of a face angle, an eye position, and a head position.

6. The system of claim 1, wherein the facial feature data includes at least one of an operator's ear position, eyebrow position, nose position, mouth position, and jawline position.

7. The system of claim 1, wherein the driver status monitor, in response to receiving the facial feature data corresponding to the operator looking at the rear-view mirror, is configured to determine that the operator is looking at the rear-view mirror when at least one of a head position and an eye position changes from a first position to a second position at one of a threshold head speed and a threshold eye speed.

8. The system of claim 1, wherein the driver status monitor, in response to receiving the facial feature data corresponding to the operator looking at the side mirror, is configured to determine that the operator is looking at the side mirror when at least one of a head and an eye position changes from a first position to a second position at one of a threshold head speed and a threshold eye speed.

9. A method comprising:
   sensing, using a driver status monitor, facial feature data associated with an operator of a subject vehicle;
   receiving, using an electronic control module of the driver status monitor, the facial feature data associated with the operator of the subject vehicle;
   determining, using the electronic control module of the driver status monitor, whether the operator has looked at one of a side mirror and a rear-view mirror within a predetermined time period;
   determining, using the electronic control module of the driver status monitor, whether the operator has looked at a blind spot of the subject vehicle within the predetermined time period;
   communicating, using the electronic control module of the driver status monitor, a signal to a controller in response to the electronic control module determining that the operator has looked at one of the side mirror and the rear-view mirror and the operator has looked at the blind spot of the subject vehicle within the predetermined time period; and
   activating, with the controller, a turn signal system in response to receiving the signal from the electronic control module of the driver status monitor.

10. The method of claim 9, wherein the method further includes detecting, using a blind spot warning system, a presence of a secondary vehicle in the blind spot of the subject vehicle and generating, with the blind spot warning system, an alert indicating the presence of the secondary vehicle in the blind spot of the subject vehicle.

11. The method of claim 10, wherein the alert includes at least one of a visual alert, an audio alert, and a haptic alert.

12. The method of claim 9, wherein the method includes determining, using the electronic control module of the driver status monitor, that the operator is looking at the side mirror when at least one of a head and an eye position of the operator changes from a first position to a second position at one of a threshold head speed and a threshold eye speed.

13. The method of claim 9, wherein the method includes determining, using the electronic control module of the driver status monitor, that the operator is looking at the rear-view mirror when at least one of a head position and an eye position of the operator changes from a first position to a second position at one of a threshold head speed and a threshold eye speed.

* * * * *